(12) United States Patent
Hartenstine

(10) Patent No.: US 7,152,778 B2
(45) Date of Patent: Dec. 26, 2006

(54) COLLECTING AND VALUATING USED ITEMS FOR SALE

(75) Inventor: Troy A. Hartenstine, San Francisco, CA (US)

(73) Assignee: Bitstock, San Francisco, CA (US)

( * ) Notice: Subject to any disclaimer, the term of this patent is extended or adjusted under 35 U.S.C. 154(b) by 0 days.

(21) Appl. No.: 10/870,158

(22) Filed: Jun. 18, 2004

(65) Prior Publication Data

US 2004/0267818 A1    Dec. 30, 2004

Related U.S. Application Data

(60) Provisional application No. 60/480,437, filed on Jun. 23, 2003.

(51) Int. Cl.
*G06F 17/00*     (2006.01)
(52) U.S. Cl. .................... 235/375; 235/485; 705/27
(58) Field of Classification Search ............... 235/375, 235/379, 385, 487, 485; 705/1, 26–29
See application file for complete search history.

(56) References Cited

U.S. PATENT DOCUMENTS

| | | | | |
|---|---|---|---|---|
| 6,041,310 | A * | 3/2000 | Green et al. ................... | 705/27 |
| 6,256,032 | B1 | 7/2001 | Hugh | |
| 6,529,805 | B1 * | 3/2003 | Aldrich et al. ................. | 701/1 |
| 6,754,570 | B1 * | 6/2004 | Iihoshi et al. ................. | 701/33 |
| 6,868,389 | B1 * | 3/2005 | Wilkins et al. ............... | 705/10 |
| 2001/0047305 | A1 * | 11/2001 | Bowen, Jr. ................... | 705/26 |
| 2002/0087420 | A1 * | 7/2002 | Higgins et al. ............... | 705/26 |
| 2002/0198761 | A1 * | 12/2002 | Ryan et al. ................... | 705/10 |
| 2003/0036964 | A1 * | 2/2003 | Boyden et al. ............... | 705/26 |
| 2003/0046199 | A1 * | 3/2003 | Murase et al. ............... | 705/35 |
| 2003/0065584 | A1 * | 4/2003 | Takaoka ....................... | 705/26 |
| 2003/0105728 | A1 * | 6/2003 | Yano et al. .................. | 705/400 |
| 2003/0130966 | A1 * | 7/2003 | Thompson et al. ......... | 705/500 |
| 2003/0171999 | A1 * | 9/2003 | Shishido ...................... | 705/26 |
| 2003/0187714 | A1 * | 10/2003 | Perry et al. ................... | 705/10 |
| 2003/0200151 | A1 * | 10/2003 | Ellenson et al. ............. | 705/26 |
| 2003/0204501 | A1 * | 10/2003 | Moon ............................ | 707/3 |
| 2004/0039663 | A1 * | 2/2004 | Kernz ............................ | 705/27 |
| 2004/0172266 | A1 * | 9/2004 | Sheinson et al. ............. | 705/1 |
| 2004/0221116 | A1 * | 11/2004 | Hu et al. ...................... | 711/158 |
| 2005/0267774 | A1 * | 12/2005 | Merritt et al. ................ | 705/1 |

\* cited by examiner

*Primary Examiner*—Daniel Stcyr
*Assistant Examiner*—Edwyn Labaze

(57) ABSTRACT

Data is collected and aggregated regarding a particular used item for sale, e.g., automobiles, which is in turn validated and normalized with respect to pre-determined identification models. A historical report may be generated to provide an assessment of value based on qualitative information such as mileage and/or location, and may be presented in a multi-axis graphic format. Data records are collected from a plurality of sources over the Internet, and are validated by comparing data field entries in the aggregate data records with data field entries in an established validation database. The validated data records are normalized with respect to a predetermined set or sets of fields by assigning an identification unit to each validated data record. A web crawler to seek out suitable data records relating to the used items that are sought, a search engine is queried to derive a list of suitable high probability target URLs.

38 Claims, 9 Drawing Sheets

COLLECTING AND VALUATING USED ITEMS FOR SALE

This application claims priority from U.S. Provisional Application No. 60/480,437, filed Jun. 23, 2003, entitled "Method and System for Valuating Products for Sale Across a Computer Network", to Troy A. Hartenstine, the entirety of which is expressly incorporated herein by reference.

BACKGROUND OF THE INVENTION

1. Field of the Invention

This invention relates to electronic commerce and network information management services. More particularly, it relates to a method, system, and computer network product for assessing the value of and/or locating used objects for sale, particularly pre-owned automobiles, across a network such as the Internet.

2. Background of Related Art

The present-day marketplace of buying and selling automobiles has many inefficiencies which result in poor productivity and lost sales. It is estimated that in 2002, there were approximately 43 million pre-owned automobiles for sale in the United States. However, these millions of automobiles are advertised for sale in countless, disjointed electronic databases and classified advertising. Consumers seeking to make an automobile purchase must sift through these numerous databases in a cumbersome and frustrating process. Often, when a desired advertisement is located, the price data is outdated or inventories are depleted. A drawback of this process is difficulty in reaching a confident purchasing decision.

Conventional search engines do not solve the problems. For instance, when performing a search for a "1993 Porsche 911", conventional search engines are not able to satisfactorily distinguish from toys, photos, museums, fan websites, etc., leaving the user to manually sort through literally thousands of located web sites in search of a car for sale, and even then it is hoped that the located car is still for sale. A laborious process at best, and useless at worst.

A further drawback with regard to the present-day avenues for buying and selling used items such as automobiles relates to location information. For example, in the case of used automobiles, BMWs may sell for thousands of dollars more in San Francisco than in other markets, and Mercedes-Benz automobiles extract a similar premium in the Los Angeles area, as compared with other cities. The disjointed resource of classified advertising makes it difficult for consumers to obtain accurate price information and realize such geographic disparities in automobile pricing.

There is a need for a system that is capable of efficiently providing a user with current and accurate information regarding used items for sale, and which is capable of providing guidance for better decision making for both buyers and sellers.

SUMMARY OF THE INVENTION

In accordance with the principles of the present invention, a method and apparatus for aggregating a database of used items for sale comprises collecting a plurality of data records corresponding to the used items from a plurality of different network sites. Each of the data records is validated to confirm that it is a used item of the desired type for sale. Each of the data records are normalized with one of a pre-defined list of identification units.

In accordance with another aspect of the present invention, a method and apparatus for normalizing disparate data records to a pre-defined set of identification units comprises matching a plurality of fields of a data record to a unique identification unit represented by a plurality of different representations of a common set of features. The data record is stored in a database in a way that associates the data record with the unique identification unit.

BRIEF DESCRIPTION OF THE DRAWINGS

Features and advantages of the present invention will become apparent to those skilled in the art from the following description with reference to the drawings. It should be understood that these Figures are provided to illustrate the invention and are exemplary and not limiting in nature.

DETAILED DESCRIPTION OF ILLUSTRATIVE EMBODIMENTS

In accordance with the principles of the present invention, aggregate data is collected regarding automobiles, which is in turn validated and normalized with respect to pre-determined identification models. Validated and normalized data records are processed, and a report may be generated to provide an assessment of value. According to one aspect of the invention, the report may be made accessible to users over the Internet in an interactive multi-axis graphic format.

The present invention provides an electronic inventory of automobiles with real-time pricing and location information. The invention will promote confidence in car buying and selling decisions.

In one aspect, the invention features a method of providing automobile pricing information to a user over the Internet. A graphical user interface is provided to a user on a computer system. A graph is displayed having a first axis being a mileage function and a second axis being a price function. The price and mileage of individual automobiles for sale of a predetermined year and make may be depicted on the graph, thereby enabling the user to assess the relative value of a plurality of automobiles having the same model, make, and year, e.g., according to price and mileage.

The term "user" herein is intended to encompass many different types of users who may benefit from and make use of the invention. For instance, automobile dealers and brokers are contemplated users who may, for example, make use of the invention to price inventory and evaluate changing market conditions. Also, individual consumers are contemplated as users who may desire to know the reasonable market price for an automobile in view of various considerations such as make, model, geographic locale, and mileage.

According to another aspect of the invention, a comprehensive, unified database of pre-owned automobile data is obtained, and a report is generated based on the unified database.

Aggregate data records are collected from a plurality of sources over the Internet.

The aggregate data records are validated by comparing data field entries in the aggregate data records with data field entries in an established validation database.

The validated data records are normalized with respect to a predetermined set or sets of fields by assigning an identification unit to each validated data record. The identification unit is determined as a function of the predetermined set(s) of fields (preferably the predetermined set of fields being the query fields).

The data records are preprocessed according to the identification units wherein each preprocessed data record includes a set of query fields and predetermined result fields.

A report is generated regarding the result fields in view of a certain set of query fields selected by a user.

Figure 1:
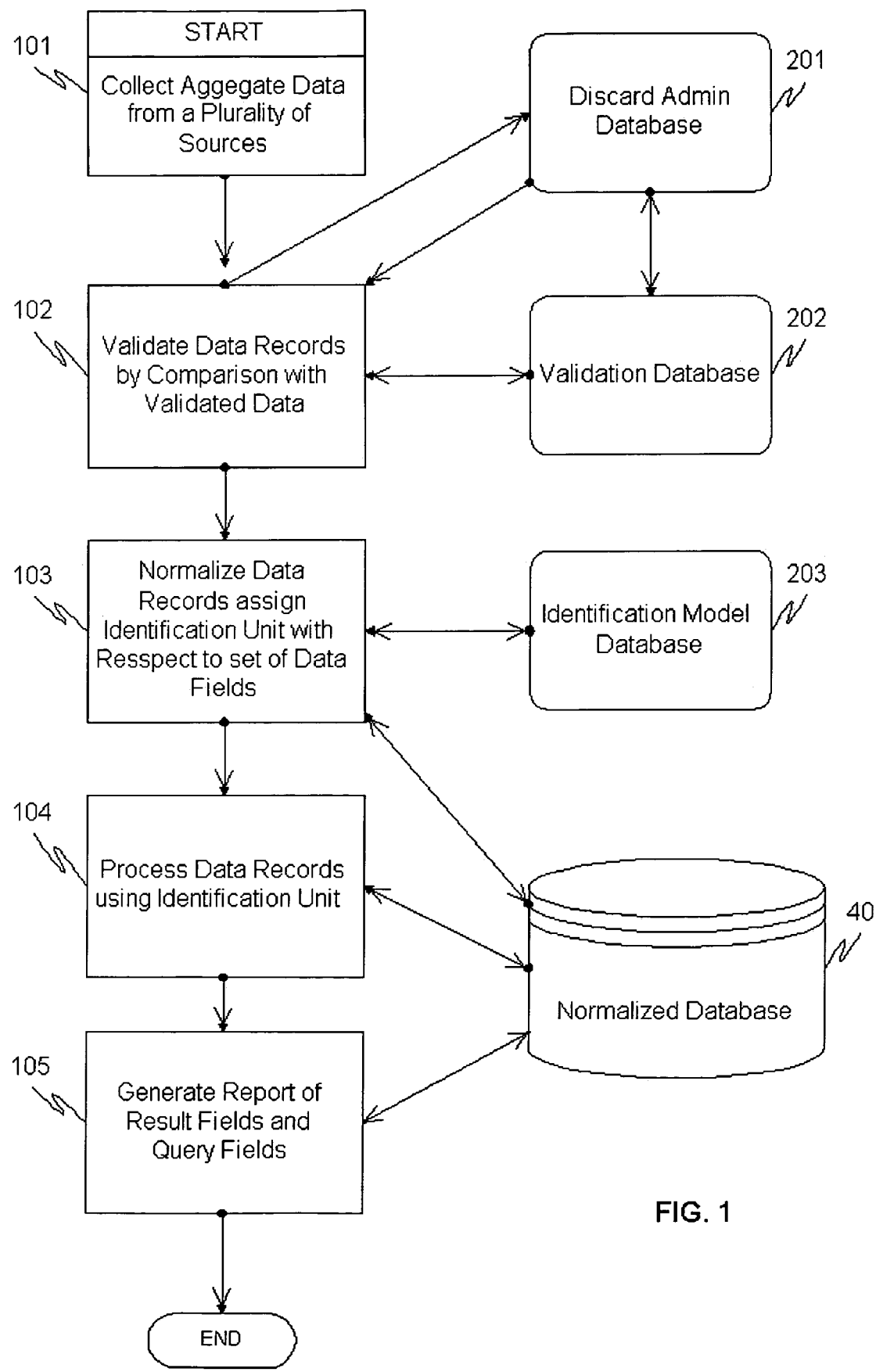
FIG. 1 shows a block diagram illustrating exemplary steps of valuating and collecting used items for sale (such as used automobiles) across a computer network, in accordance with the principles of the present invention.

FIG. 1 shows a block diagram illustrating exemplary steps of valuating and collecting used items for sale (such as used automobiles) across a computer network, in accordance with the principles of the present invention.

In particular, as shown in FIG. 1, used items for sale are collected and aggregated from a plurality of sources in step 101. In step 102, collected data records are validated by comparison with validated data retrieved from a validation database 202. Importantly, validated data is normalized by comparison with predefined identification data for a given set of data fields (e.g., year, make and model) associated with a given identification unit number. Identification data is predefined and maintained in an identification model database 203. Normalized data records are stored and maintained in a normalized database 40, where they may be later processed by suitable processes in a process data records module 104.

Ideally, normalized data records maintained in the normalized database 40 are maintained even after they are determined to have been sold or otherwise disposed of, for historical and later valuation purposes. For instance, price versus mileage charts may be derived using historical data records to generate suitable reports used for valuating in a report generation module 105. These records may be generated using any desirable filter, e.g., for used items sold within a given time period past or present, used items sold from a given state or geographical boundary, only used items that were of a particular color, etc.

Figure 2:
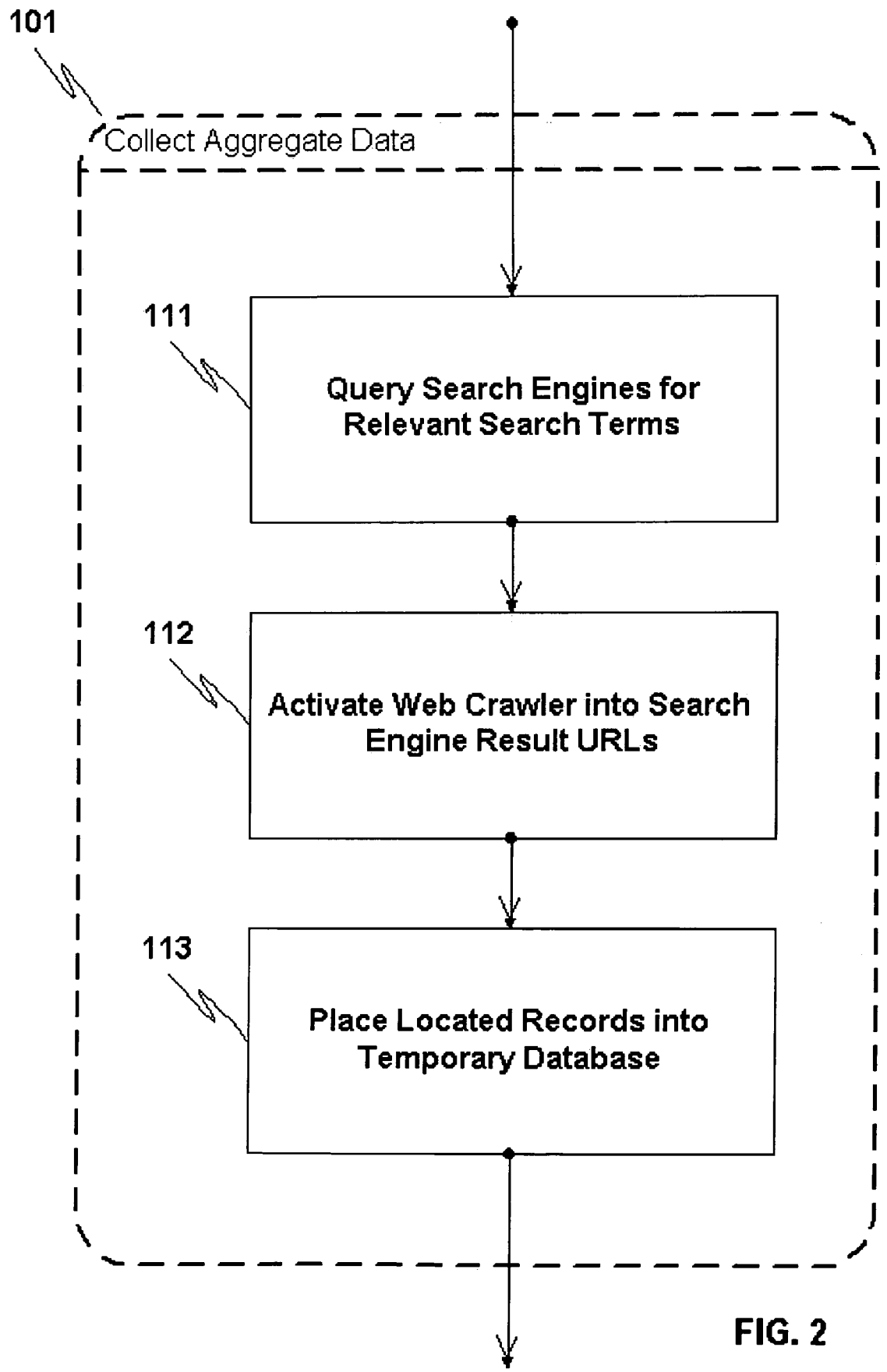
FIG. 2 shows in more detail the step of collecting aggregate data from a plurality of sources, as shown in FIG. 1.

FIG. 2 shows in more detail the step of collecting aggregate data from a plurality of sources, as shown in FIG. 1.

In particular, as shown in step 101 of FIGS. 1 and 2, aggregate data is collected from a plurality of sources, e.g., across the Internet. These sources may include, for example, classified advertisements, dealer websites, automobile clubs, or any other websites or Internet sources by which a person may seek to advertise an automobile for sale.

The aggregate data records are collected according to predetermined fields, e.g., fields are selected and used as a basis to canvass the plurality of Internet sources to extract desired records having automobile sales data. The predetermined fields preferably include certain "query" fields (i.e., fields which the user inputs into the computer to generate a report on the graphical user interface, i.e., a computer display), and a set of "result" fields (i.e., fields which will be displayed on a report, preferably a multi-axis report, generated on the GUI).

Exemplary query fields may comprise the year, make, and model of an automobile. Exemplary report fields may comprise the mileage of the relevant automobile, and the price at which the automobile is listed for sale.

Various other fields may be searched and used to extract the aggregate data records from the plurality of Internet sources. For example, color, location, horsepower, time stamp of advertisement, originating URL, etc., may be used as a basis for the search and extraction.

Preferably, before activating a web crawler to seek out suitable data records relating to the used items that are sought, a search engine is queried to derive a list of suitable high probability target Universal Resource Locators (URLs).

Thus, as shown in step 111 of FIG. 2, one or more search engines are queried for URLs presenting relevant search terms. The relevant search terms are predetermined and are specific to the particular item being sought. The network sites that may be queried include, e.g., classified item web sites, or sites of individuals, groups or organizations having items for sale. For instance, classified item sites might include the classified section of electronic versions of newspapers, or auction sites such as EBAY™. Sites with items for sale might include clubs (e.g., car clubs), or dealers (e.g., car dealers).

The search terms may be chosen based on the particular items being searched. For instance, in the case of used automobiles, the search engines may be queried with things like "classifieds", "used cars", "used vehicles", "used car advertising", etc. to produce a list of high probability URLs.

In step 112, one or more web crawlers may be activated into the high probability URLs in search of suitable data records relating to the used items for sale that are being sought.

Data records resulting from the web crawler activities are placed into temporary database storage as shown in step 113. The temporary database storage may be local, or may be centrally located.

Data records may be passed through a statistical filtering to determine the validity of certain information, e.g., price. For instance, in the case of data records obtained from an auction site with an ongoing auction, the pricing may be compared to a valid range of prices determined from a statistical analysis of prior valid data obtained for the same type item. In the case of data records from an ongoing auction, it is preferred that a particular item already logged be updated as to price as updated pricing information is obtained. Information such as a unique auction item number may be used to correlate newly obtained data records with data records already obtained and logged into the normalized database 40.

Figure 3:
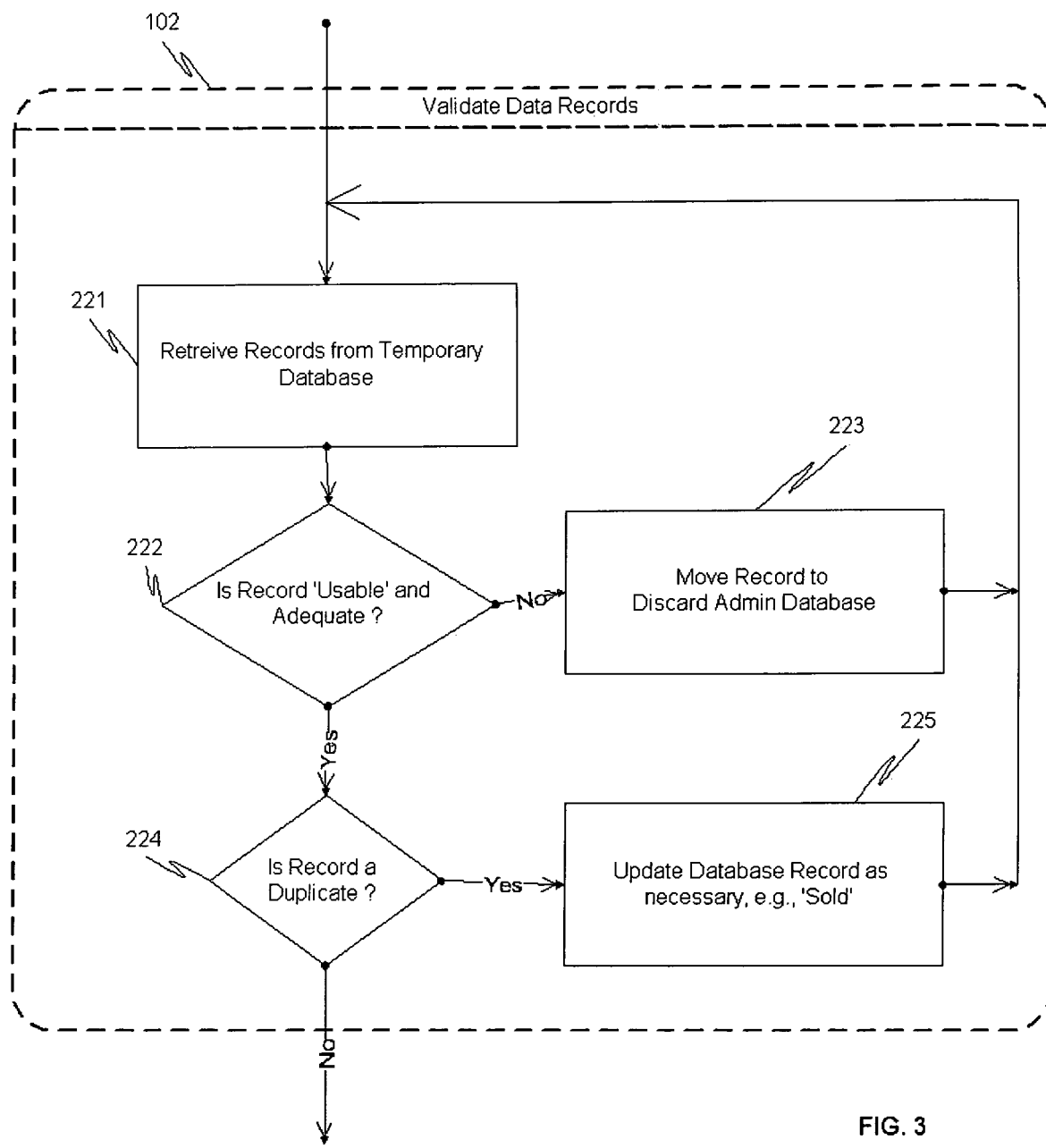
FIG. 3 shows in more detail the step of validating collected data records, as shown in FIG. 1.

FIG. 3 shows in more detail the step of validating collected data records, as shown in FIG. 1.

In particular, as shown in step 102, data records are validated by comparison with validated data, e.g., maintained in a validation database 202. Initially, all records are placed in a temporary database. Upon an attempt to validate and normalize a particular record, if unsuccessful, invalidated and/or non-normalized records are moved to a discard administrative database 201.

As shown in step 221 of FIG. 3, a record is retrieved from a temporary database. In step 222, it is determined whether or not the record being looked at meets relevant criteria, e.g., is it usable and adequate. In other words, is it a data record relating to a used item of the desired type for sale? If so, the process moves on to step 224, if not, the record is moved to the discard administration database 201, and the next record is retrieved by step 221.

In step 224, it is determined whether or not the record is a duplicate of a record already maintained in the normalized database 40. Duplication may be determined based on any desirable matching criteria. For instance, a matching make, model, year, and location may be enough in given applications. Alternatively, simply a matched model and phone number between the current record and a record already maintained in the normalized database 40 may be enough to determine duplication.

If the current record being looked at is a duplicate of a record already maintained, the record already maintained in the normalized database may be updated as necessary. For instance, if the record being looked at is determined to be a duplicate of an entry already in the normalized database 40, but the price is reduced, the record in the normalized database may be updated to reflect the reduced price.

Price history for a given record may alternatively be maintained, to reflect how the price of an item for sale has fared while it's been for sale. If the new record reflects that the item has been sold, then the normalized database entry may be updated to reflect that the item is no longer for sale. Users may appropriately filter out review of any/all items that have already been sold at any time, or based on a given time period, past or present.

The validation process may, if desired, invalidate any entries that are already sold and thus not allow them to enter the normalized database 40. However, in the disclosed embodiment, even sold entries are collected, validated, normalized and stored in the normalization database 40, to provide a larger database of historical items useful in valuating a similar item that may later be for sale.

Figure 4:
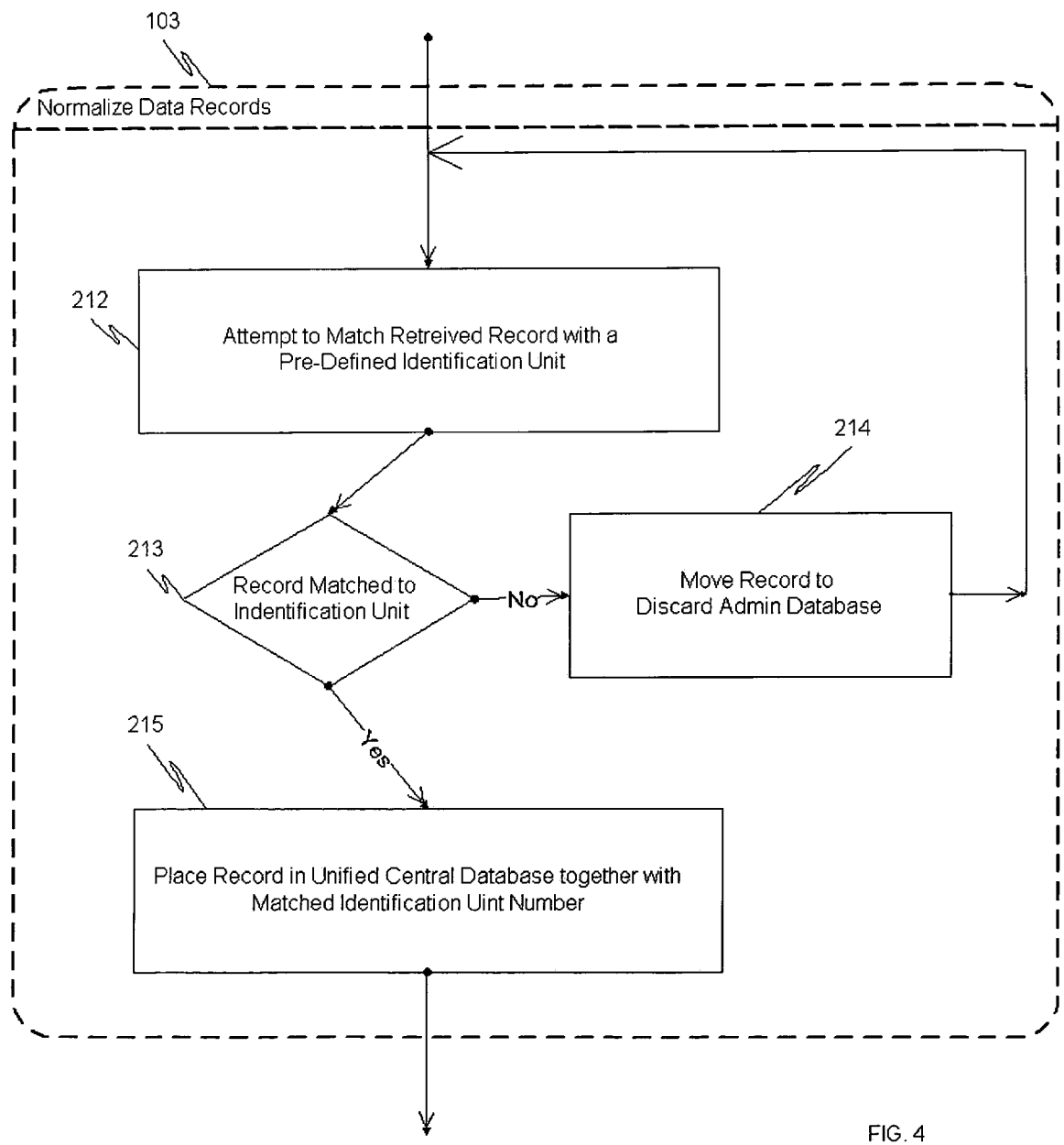
FIG. 4 shows in more detail the step of normalizing data records by assigning a predefined identification unit based on a determined match with a given set of data fields, as shown in FIG. 1.

FIG. 4 shows in more detail the step of normalizing data records by assigning a predefined identification unit based on a determined match with a given set of data fields, as shown in FIG. 1.

In particular, in step 103, data records are normalized according to predetermined identification units, and stored in a suitable portion of the identification model database 203. The validated data records are compared with the identification model database, and an identification unit is assigned to each validated data record. Predetermined identification units are predetermined or pre-assigned based on a selected set or sets of data fields.

In step 212, an attempt is made to match a record retrieved from the temporary database with a pre-defined identification unit maintained in the identification model database 203. The match need not be perfect. For instance, a match above a given threshold amount (e.g., above 75%) may be suitable for given applications, and thus may be appropriately set by a system programmer or operator.

In step 213, the decision as to whether the retrieved record is matched or not is made. If the record is matched to a pre-defined unit, then the process continues to step 215. If not, then the temporarily stored record is moved to the discard administration database 214 for possible later manual or semi-automatic review of its normalization status.

In step 215, the record is moved from the temporary database to the normalized database 40 based on its normalized identification unit. Once an identification unit can be assigned to the record, the record is referred to herein as being 'normalized'.

This normalization process is very important to the present invention, as it allows for efficient storage, and accurate and efficient retrieval for specific searches. For instance, if all 1993 Porsche 911's are assigned to identification unit '10', whenever a user query is entered relating to 1993 Porsche 911's, only those records carrying identification unit 10 in the relevant data field need be reviewed and/or used in generation of a report.

Alternative to storing each record with its normalized identification unit inserted into a relevant field, or additional to, each record may be stored in an individual database partitioned only to contain records normalized with that particular identification unit, e.g., only records normalized as relating to the unit '10'.

Based on the size of the overall database, the identification units may contain only one, or preferably several or more data fields. For instance, in the disclosed embodiment relating to the collection and valuation of used cars, identification units may be pre-assigned based on the combination of make, model and year. However, in a small application, perhaps just make and model is sufficient. Alternatively, in a large application, perhaps additional data fields are necessary to make the normalization database more manageable, e.g., the combination of make, model, year and color.

Preferably, for most efficient operation, the query fields are used as the predetermined set of data fields used for creating the identification model database. According to one exemplary embodiment of the invention, an identification model database may be created wherein the predetermined set of data fields used to assign identification units comprise the year, make and model of an automobile. Other sets and combinations of data fields may be alternatively or additionally used.

As an example, assume that the following sets of fields, e.g., year, make and model, known as a sub-database schema, are assigned as shown in table 1.

| SETS OF FIELDS | IDENTIFICATION UNIT |
|---|---|
| "1990 Porsche 911" | 10 |
| "1991 Porsche 911" | 11 |
| "1992 Porsche 911" | 12 |
| "1993 Porsche 911" | 13 |
| "2000 Volvo S40" | 20 |
| "2000 Volvo S60" | 60 |
| etc. | etc. |

Also, to allow maximum possibility of retrieving relevant records, alternative spellings, abbreviations, common misspellings, etc. may be combined into the same identification units. For instance, in the case of a 1990 Porsche 911, pre-assigned identification unit 10, additional entries may be made in the identification model database 203 in an attempt to capture such records. Thus, as an example:

| SETS OF FIELDS | IDENTIFICATION UNIT |
|---|---|
| "1990 Porsche 911" | 10 |
| "90 Porsche 911" | 10 |
| "1990 Por 911" | 10 |
| "1990 Porche 911" | 10 |
| "'90 Porshe 911" | 10 |
| "1990 Pors 9111" | 10 |
| etc. | etc. |

Preferably, an identification model database is established prior to the normalization performed in step 103. It will be apparent to those of ordinary skill in the art that the amount of inventory that can be processed efficiently increases with the size of the identification model database 203.

In step 104, data records are processed using the identification units. As shown in step 104, normalized data records are preprocessed using the identification units, which preferably correspond to the query fields. For example, the query fields shown in Table 1 are year, make and model.

This step 104 of preprocessing is advantageous in that it breaks a larger database into smaller, more manageable databases. For example, in the preprocessing step 104, data records may be allocated to "subdatabases" within a central, unified database 40, based on their identification units. This greatly facilitates efficient operation, which is of particular importance as the size of the overall number of entries in the system increases.

As an illustration, drawing on the above examples of identification units, all data records relating to automobile advertisements for Year: 1990, Make: Porsche, Model: 911 automobiles would be placed in a first smaller, or sub-database. All data records relating to Year: 2002, Make: Volvo, Model: S40 automobiles would be placed in a second sub-database, and so forth and so on.

Allocation of identification units based on field parameters corresponding to query fields, performed in step 103, together with a preprocessing step 104, allows for efficient maintenance of the overall database, as well as efficient generation of a desired report.

In step 105, a report may be generated based upon entry of certain query fields by a user. In a disclosed embodiment, such a report is generated in a multi-axis graphical form, displaying more than one parameter relating to each searched and obtained current automobile for sale. For instance, in one disclosed report, at least one axis of the multi-axis graphical report will correspond to price, whereas a second axis may correspond to mileage, geographical location, sales lead, and so forth.

The report may be a visual display and/or printout comprising a "scatter graph" type plot. The scatter graph may show all data points, or may simplify the presentation by showing just a curve drawn based on the data points using, e.g., linear regression curve fitting techniques.

In a disclosed embodiment, a report generated in step 105 of FIG. 1 is a plot of price of the automobile versus mileage, preferably for a given identification unit (e.g., for a given year, make and model automobile).

A linear regression curve may be superimposed on the scatter graph to depict an average price. A data set of individual automobiles can be represented in points or dots on the graph which the user can activate to obtain particularized information regarding an automobile such as mileage, price, and location.

Figure 5:
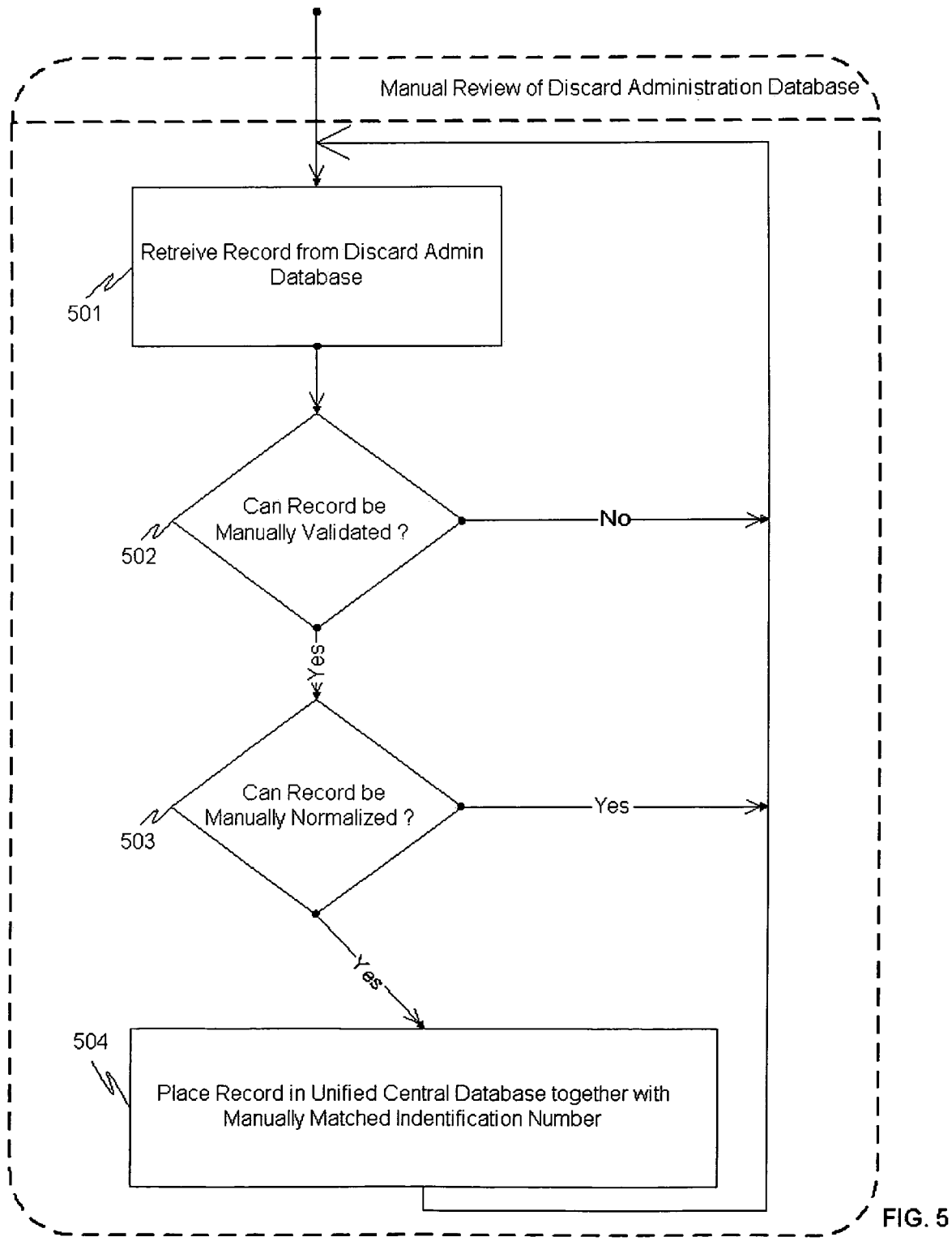
FIG. 5 shows exemplary steps in a manual or semi-automatic review of previously invalidated and/or non-normalized records stored in the discard administration database.

FIG. 5 shows exemplary steps in a manual or semi-automatic review of previously invalidated and/or non-normalized records stored in the discard administration database. Thus, even after data records fail to get validated, or get validated but fail to be normalized (and thus were placed in the discard administration database), they may still be suitable records. It's just that the chosen perturbations of spellings, misspellings, abbreviations, etc. may not have captured some records. In accordance with an aspect of the present invention, the collection and valuation system may be continually updated and refined to capture these relevant data records using information learned from a manual or semi-manual review of relevant records that failed to be automatically validated and/or normalized.

In particular, as shown in step 501 of FIG. 5, a record is retrieved from the discard administration database 201. In step 502, it is determined whether or not the retrieved record can be manually validated. That is, does the record relate to a desired item (e.g., used car). If not, the process moves back to step 501 to retrieve the next record stored in the discard administration database 201. However, if the record can be validated, then the process moves on to step 503 to see if it can be manually normalized. If not, again the process moves back to step 501 to retrieve the next record from the discard administration database 201. However, if the record can be normalized, e.g., the operator performing the manual review can recognize an identity of the particular data fields relevant to the identification unit definitions (e.g., make, model, year in the case of used cars), then the operator may manually assign the relevant identification unit to the record, and cause the record to be moved to the normalization database 40 based on that identification unit, as shown in step 504.

Figure 6:
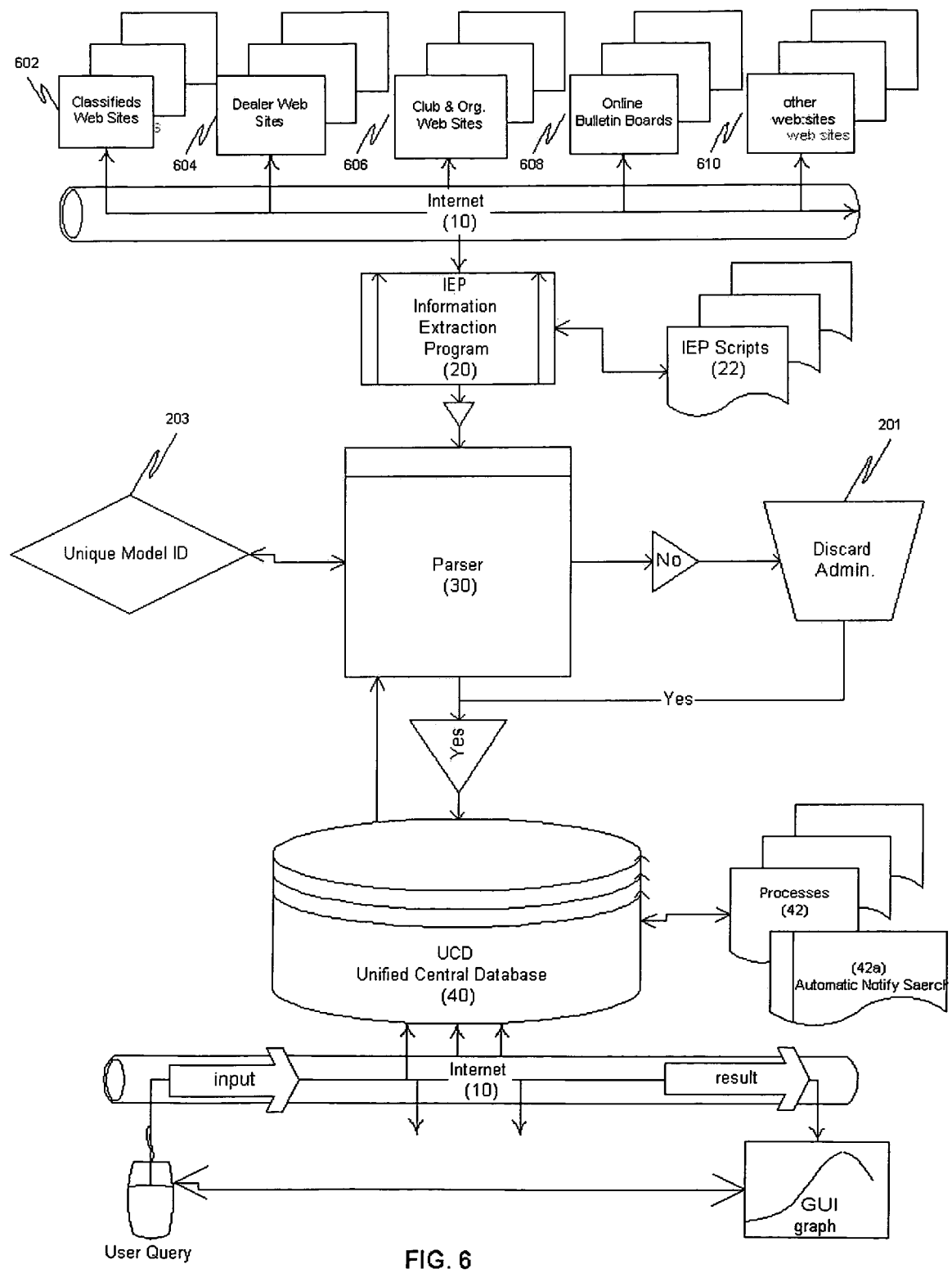
FIG. 6 shows an exemplary automobile valuation system, in accordance with the principles of the present invention.

FIG. 6 shows an exemplary automobile valuation system, in accordance with the principles of the present invention.

As shown in FIG. 6, an information extraction program 20 collects and aggregates data records from a plurality of sources. The information extraction program 20 is instructed by one or more information extraction scripts 22, to extract information via the Internet 10, from a plurality of web-based sources, and/or from sources such as classified advertisements 602, dealer websites 604, autoclubs 606, online bulletin boards 608, and/or other network sites 610.

The disclosed information extraction program 20 is a software computer program which may be, e.g., any of a number of computer program products that are currently commercially available and otherwise conventional. For example, the following are exemplary software products that may be applied to perform this function: iOpus Internet Macros™, available from Iopus company, at www.iopus-.com; Visual Web Task™ available from Lencom Software company, at www.lenccom.com; Advanced Information Extractor (AIE)™ available from Poorva company at www-.poorva.com; WebQL™ available from www.ql2.com; and/or Kapow Web Clipper™ available from Kapowtech Company at www.kapowtech.com.

To extract, collect and aggregate relevant data entries regarding automobiles as described with respect to step 101 shown in FIG. 1, the information extraction program 20 of FIG. 6 is preferably adapted for use with IEP scripts 22. The IEP scripts (IES) 22 may be autonomous, semi-autonomous, or hard-coded. In this way, the information extraction program 20 will be instructed to canvass a plurality of Internet sources for predetermined data field entries, to retrieve desired data records containing the predetermined data field entries, and to then feed these collected and aggregated data records into a preliminary processing database referred to herein as a parser 30.

The parser 30 performs the validation step 102 and the normalization step 103 described above. The parser 30 may be created from application code written in, e.g., JAVA, JSP (Java Server Pages), and/or HTML, e.g., utilizing a Java 2 Software Development kit known as the j2sdk provided by http://java.sun.com; Tomcat Jakarta versions 3, 4, and 5 available from http://www.apache.org; Jcreator Pro for Java Development; UltraDev JSP development tools; Apache 2 server engine; and/or SAP DB 7.4 RDBMS.

The parser 30 receives data records from the information extraction program 20, and performs the validation function of step 102 (FIG. 1) with respect to each data field of each aggregate data record with entries in a unified central database (UCD) 40. The particular data fields that are checked for validation may be predetermined.

For example, the parser 30 may validate based only on the year, make and model portion of the record. In those instances where data fields fed to the parser 30 cannot be validated based on established or previously validated entries in the unified central database 40, the data fields are sent to and tabulated in the discard administration database (DAD) 201.

While the unified central database 40 is shown as a singular database in FIG. 6, it may instead be divided among multiple physical computers and/or locations.

Similarly, the discard administration database 201 may be distributed among just a few or many physical database locations. Moreover, discard reasons (e.g., record not recognized, out of range, model not supported, etc.) may be a basis for discarding the relevant data record into any one of the database locations comprising the discard administration database 201.

The discard tables in the discard administration database 201 may be interpreted manually, or may be interpreted by semi-automated software programs.

The parser 30 and/or the unified central database 40 may be instructed to accept and validate aggregate data records subsequently extracted and sent to the parser 30. Data records which are validated by the parser 30, either initially or upon processing through the discard administration database 201, are then normalized by normalization components 32 in the parser 30, with reference to the unique categories established in the identification model database (IMD) 203.

The identification model database 203 may be pre-established manually or automatically based on knowledge of prevalent and even antique automobiles, manufactured in a particular country, or anywhere in the world. Given the knowledge of the years that a particular model was made, makers names and abbreviations, the models available each year, etc., a suitable identification model database 203 may be created.

Figure 7:
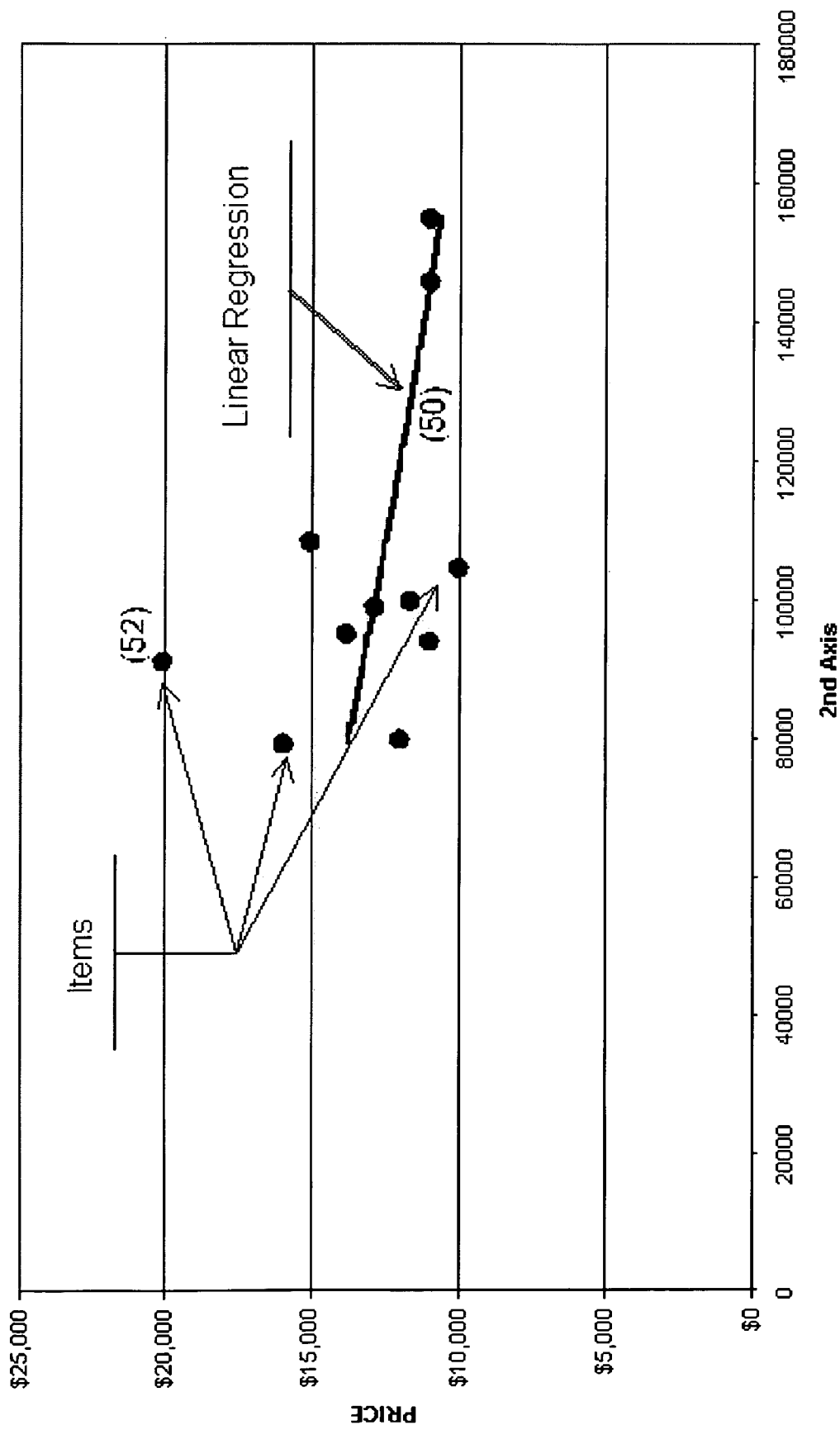
FIG. 7 depicts an exemplary report of automobile data generated according to the invention comprising a graphical display of price to mileage information.

FIG. 7 depicts an exemplary report of automobile data generated according to the invention comprising a graphical display of price to mileage information.

In particular, as shown in FIG. 7, a report may be generated with the inventive valuation system for automobiles that enables a user to make well founded selection and purchasing decisions quickly and accurately for a given automobile, as presented by the given identification unit.

Particular applications of the invention may implement user oriented features as processes 42. For instance, in one exemplary process 42*a*, the user may input a request to be notified when a new item of a particular identification unit (e.g., when a 1903 Model A Ford) for sale is found. Such notification may be immediate upon identification of the relevant record in the normalized/unified database 40, or may be provided on a periodic basis summarizing entries found since the prior report.

Another process 42 that can be implemented generates a sales lead and referral, e.g., information may be provided to the user referring them to a listed dealer. According to one aspect of the invention, a dealer identifier may appear on a visual display page, referring a user to said dealer. Such referrals can provide a significant source of revenue for the system operator.

Figure 9:
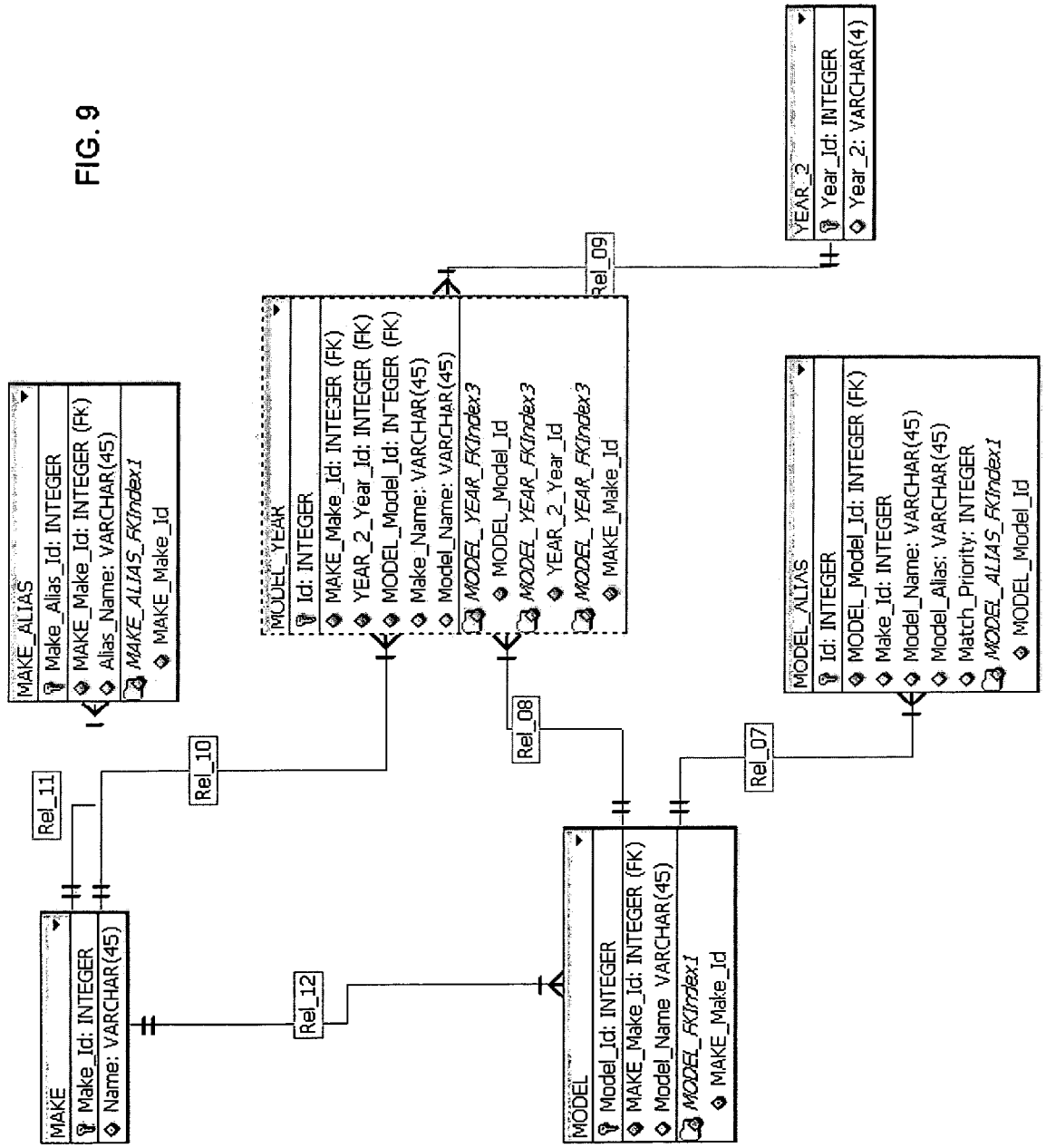

FIGS. 9 and 10 show an exemplary schema for used by the normalized database 40 for an automobile embodiment, in accordance with the principles of the present invention.

Figure 8:
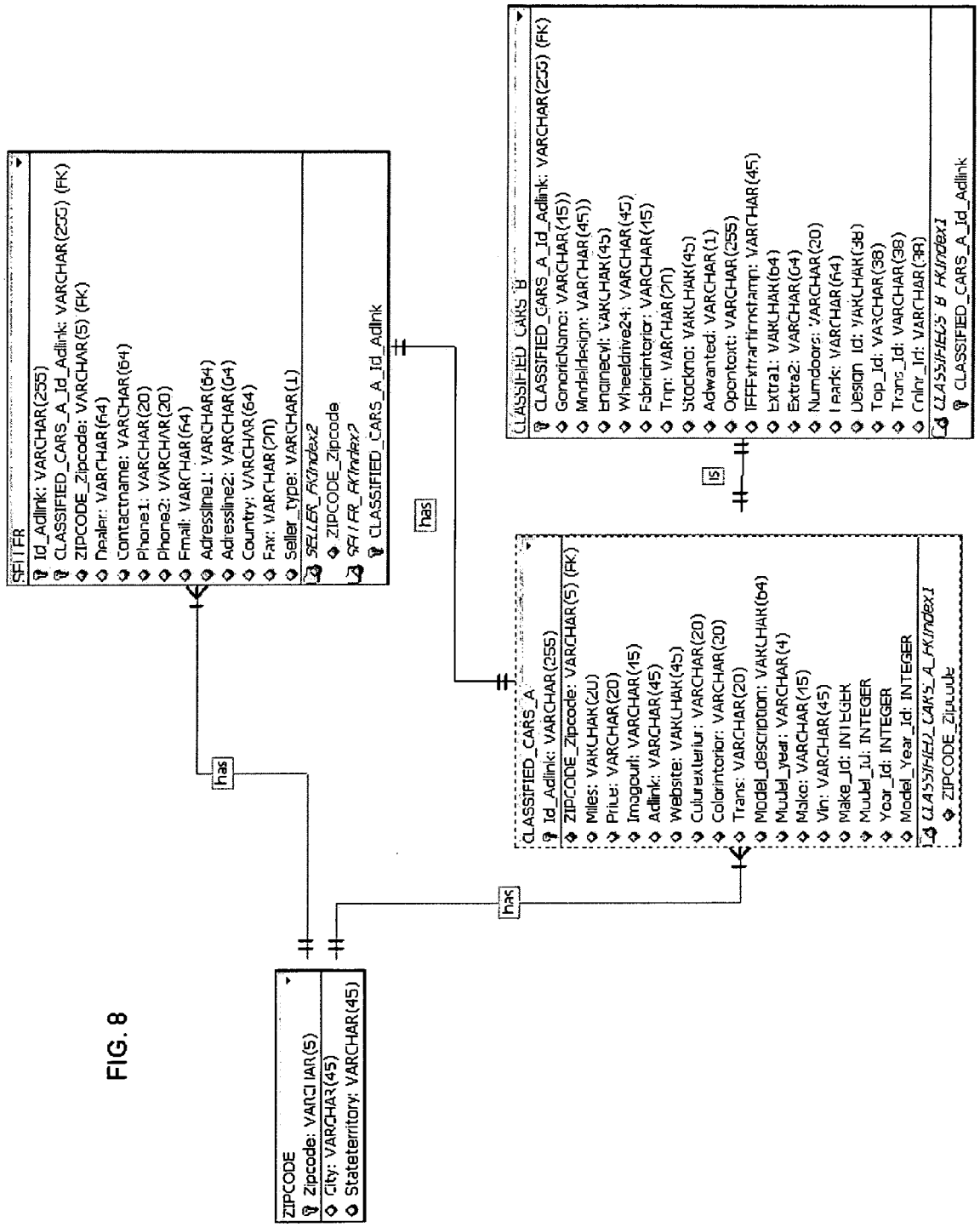
FIGS. 8 and 9 show an exemplary schema for used by the normalized database for an automobile embodiment, in accordance with the principles of the present invention.

The particular schema shown in FIGS. 8 and 9 are by way of example only. Many other variations are possible, including additional variables, or eliminated variables, within the scope of the present invention.

Of particular note in FIG. 9 is the use of alias variables with respect to MAKE and MODEL of automobile for sale. Use of alias variables allow normalization of the data records with respect to make and model for placement in the normalized database 40. While not shown in FIG. 9, alias variables may also be implemented for MODEL_YEAR, to also allow normalization of the year component of a classified ad in a respective data record before placement into the normalized database 40.

The database schema shown in FIGS. 8 and 9 shows a '1-to-many' type relationship common in database structures, useful for allowing association of a plurality of aliases to one particular 'normalized' variable. For instance, text strings "1999" or "99" or "'99" may all be associated with, or aliased to, a normalized value of "1999".

In describing the representative embodiments of the invention, the specification may have presented the method and/or system of the invention as a particular sequence of steps. However, to the extent that the process does not rely upon the particular order of steps herein, the method or system should not be limited to the particular sequence described.

Additionally, certain steps may be simultaneously performed, or performed in a virtually simultaneous manner.

Thus, a collecting and valuating system in accordance with the principles of the present invention is capable of providing a comprehensive and current inventory of used items for sale, particularly pre-owned automobiles, with accurate real-time pricing presented in a way that saves time, builds trust in on-line shopping, and facilitates better decision-making for buyers and sellers.

While the invention has been described with reference to the exemplary embodiments thereof, those skilled in the art will be able to make various modifications to the described embodiments of the invention without departing from the true spirit and scope of the invention.

What is claimed is:

1. A method of aggregating a database of items for sale, comprising:
    activating a web crawler into a plurality of different network sites;
    collecting a plurality of data records corresponding to said items for sale from said plurality of different network sites;
    validating each of said plurality of data records to confirm that it is a item of the desired type for sale;
    normalizing each of said plurality of data records with one of a pre-defined list of identification units; and providing a user with market price information for a particular condition of a particular item for sale from said items for sale, said market price information based on said plurality of data records from said plurality of different network sites.

2. The method of aggregating a database of items for sale according to claim 1, wherein said normalizing comprises:
identifying at least one of a make and model of said item for sale.

3. The method of aggregating a database of items for sale according to claim 1, wherein said normalizing comprises:
identifying a year of said item for sale.

4. The method of aggregating a database of items for sale according to claim 1, wherein said collecting comprises:
querying at least one search engine for the identity of network sites of items corresponding to a search term relevant to finding said items for sale.

5. The method of aggregating a database of items for sale according to claim 1, further comprising:
for any of said plurality of data records that could not be validated, moving said data record to a discard administration database.

6. The method of aggregating a database of items for sale according to claim 1, further comprising:
moving each of said plurality of data records that are successful in both validating and normalizing to a normalized database.

7. The method of aggregating a database of items for sale according to claim 6, wherein said normalized database comprises:
a plurality of data records corresponding to items currently for sale; and
a plurality of data records corresponding to items already sold.

8. The method of aggregating a database of items for sale according to claim 6, wherein:
said normalized database is partitioned into separate sub-databases based on a common association with a same identification unit.

9. The method of aggregating a database of items for sale according to claim 1, wherein:
said items for sale are used vehicles.

10. The method of aggregating a database of items for sale according to claim 9, wherein:
said used vehicles are used automobiles.

11. The method of aggregating a database of items for sale according to claim 10, wherein:
said validating confirms that a data record includes at least one data field relating to a year, make and model of said used automobile.

12. The method of aggregating a database of items for sale according to claim 11, wherein:
said validating further confirms that a data record includes at least one data field relating to a price of said used automobile.

13. The method of aggregating a database of items for sale according to claim 11, wherein:
said validating further confirms that a data record includes at least one data field relating to a mileage of said used automobile.

14. The method of aggregating a database of items for sale according to claim 1, wherein:
said normalizing matches a data record with a unique combination of year, make and model of said item for sale.

15. The method of aggregating a database of items for sale according to claim 1, wherein:
said items for sale are used boats.

16. The method of aggregating a database of items for sale according to claim 1, wherein:
said items for sale are collectibles.

17. The method of aggregating a database of items for sale according to claim 1, wherein:
said identification unit is numerical.

18. The method of aggregating a database of items for sale according to claim 1, wherein:
said identification unit is alphanumerical.

19. The method of aggregating a database of items for sale according to claim 1, further comprising:
generating a relationship between said particular condition of said item for sale and said price.

20. The method of aggregating a database of items for sale according to claim 19, wherein:
said item for sale is a used automobile; and
said particular condition of said item for sale is a mileage;
wherein a plot of mileage vs. said price is generated from historical data including items that have previously sold.

21. Apparatus for aggregating a database of items for sale, comprising:
means for activating a web crawler into a plurality of different network sites;
means for collecting a plurality of data records corresponding to said items for sale from a plurality of different network sites;
means for validating each of said plurality of data records to confirm that it is a item for sale of the desired type for sale;
means for normalizing each of said plurality of data records with one of a pre-defined list of identification units; and
means for providing a user with market price information for a particular condition of a particular item for sale from said items for sale, said market price information based on said plurality of data records from said plurality of different network sites.

22. The apparatus for aggregating a database of items for sale according to claim 21, wherein said means for collecting comprises:
means for querying at least one search engine for the identity of network sites of items corresponding to a search term relevant to finding said items for sale.

23. The apparatus for aggregating a database of items for sale according to claim 21, further comprising:
means for moving said data record to a discard administration database if said data record could not be validated.

24. The apparatus for aggregating a database of items for sale according to claim 21, further comprising:
means for moving each of said plurality of data records that are successful in both validating and normalizing to a normalized database.

25. The apparatus for aggregating a database of items for sale according to claim 21, wherein:
said items for sale are used vehicles.

26. The apparatus for aggregating a database of items for sale according to claim 25, wherein:
said vehicles are used automobiles.

27. The apparatus for aggregating a database of items for sale according to claim 26, wherein said means for validating comprises:

confirming that a data record includes at least one data field relating to a year, make and model of said used automobile.

28. The apparatus for aggregating a database of items for sale according to claim 27, wherein said means for validating further comprises:
confirming that a data record includes at least one data field relating to said price of said used automobile.

29. The apparatus for aggregating a database of items for sale according to claim 28, wherein said normalized database comprises:
a plurality of data records corresponding to items currently for sale; and
a plurality of data records corresponding to items already sold.

30. The apparatus for aggregating a database of items for sale according to claim 28, wherein:
said normalized database is partitioned into separate sub-databases based on a common association with a same identification unit.

31. The apparatus for aggregating a database of items for sale according to claim 27, wherein:
said means for validating further confirms that a data record includes at least one data field relating to a mileage of said used automobile.

32. The apparatus for aggregating a database of items for sale according to claim 25, wherein:
said items for sale are used boats.

33. The apparatus for aggregating a database of items for sale according to claim 25, wherein:
said items are collectibles.

34. The apparatus for aggregating a database of items for sale according to claim 25, wherein:
said identification unit is numerical.

35. The apparatus for aggregating a database of items for sale according to claim 25, wherein:
said identification unit is alphanumerical.

36. The apparatus for aggregating a database of items for sale according to claim 25, further comprising:
means for generating a relationship between said particular condition of said item for sale, and said price.

37. The apparatus for aggregating a database of items for sale according to claim 36, wherein:
said item for sale is a automobile; and
said particular condition of said item for sale is a mileage;
wherein a plot of mileage vs. said price is generated from historical data including items that have previously sold.

38. The apparatus for aggregating a database of items for sale according to claim 21, wherein said means for normalizing comprises:
matching a data record with a unique combination of year, make and model of said item for sale.

* * * * *